United States Patent
Strosaker et al.

(10) Patent No.: US 10,764,613 B2
(45) Date of Patent: Sep. 1, 2020

(54) VIDEO MEDIA CONTENT ANALYSIS

(71) Applicant: International Business Machines Corporation, Armonk, NY (US)

(72) Inventors: Mike Strosaker, Austin, TX (US); Sandra P. Nava, Austin, TX (US); Eric Richter, Austin, TX (US); Jon P. Weiser, Austin, TX (US); George C. Wilson, Austin, TX (US); Matt Hartenbower, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/176,198

(22) Filed: Oct. 31, 2018

(65) Prior Publication Data

US 2020/0137429 A1    Apr. 30, 2020

(51) Int. Cl.
| | | |
|---|---|---|
| *G06F 15/16* | (2006.01) | |
| *H04N 21/235* | (2011.01) | |
| *H04N 21/258* | (2011.01) | |
| *H04N 21/81* | (2011.01) | |

(52) U.S. Cl.
CPC ... *H04N 21/2353* (2013.01); *H04N 21/25883* (2013.01); *H04N 21/812* (2013.01)

(58) Field of Classification Search
CPC ......... H04N 21/2353; H04N 21/25883; H04N 21/812
USPC ....................................................... 709/219
See application file for complete search history.

(56) References Cited

U.S. PATENT DOCUMENTS

| | | | |
|---|---|---|---|
| 8,190,479 B2 | 5/2012 | Surendran et al. | |
| 9,087,331 B2 | 7/2015 | Ives et al. | |
| 2008/0276266 A1 | 11/2008 | Huchital et al. | |
| 2009/0172730 A1 | 7/2009 | Schiff et al. | |
| 2011/0075992 A1* | 3/2011 | Mei .................. | G06Q 30/02 386/249 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Wing F Chan
*Assistant Examiner* — Joseph R Maniwang
(74) *Attorney, Agent, or Firm* — Heslin Rothenberg Farley & Mesiti, P.C.; Noah Sharkan, Esq.

(57) ABSTRACT

A method, computer program product, and a system where a processor(s) obtains a request, from a first client, to stream selected content, uploaded by a second client, on a streaming media platform. The processor(s) identifies a similarity between metadata associated with the selected content and metadata associated with relevant additional content uploaded to the streaming media platform, by a third client. The metadata associated with the selected content and the metadata associated with the relevant additional content describe elements in the selected content and the relevant additional content identified, based on the processor(s) performing a content analysis of the selected content and the relevant additional content. The processor(s) selects the relevant additional content to provide to the first client, with the selected content, based on the similarity. The processor(s) displays the relevant additional content with the selected content on a viewer on the first client.

18 Claims, 9 Drawing Sheets

(56) References Cited

U.S. PATENT DOCUMENTS

2011/0251896 A1* 10/2011 Impollonia ............ G06Q 30/02
705/14.55

* cited by examiner

400

```
┌─────────────────────────────────────────────────────────────┐
│ PROGRAM CODE EXECUTING ON ONE OR MORE PROCESSORS ON A       │──410
│ STREAMING MEDIA PLATFORM OBTAINS A REQUEST FROM A FIRST CLIENT│
│ UTILIZED BY A USER, TO STREAM SELECTED CONTENT OF CONTENT   │
│ UPLOADED TO THE STREAMING MEDIA PLATFORM BY A SECOND CLIENT │
└─────────────────────────────────────────────────────────────┘
                              │
                              ▼
┌─────────────────────────────────────────────────────────────┐
│ PROGRAM CODE SELECTS RELEVANT ADDITIONAL CONTENT FROM       │──420
│ ADDITIONAL CONTENT UPLOADED TO THE STREAMING MEDIA PLATFORM │
│ BY A THIRD CLIENT, TO PROVIDE TO THE FIRST CLIENT, WITH THE │
│ SELECTED CONTENT, BASED ON THE PROGRAM CODE IDENTIFYING A   │
│ SIMILARITY BETWEEN METADATA ASSOCIATED WITH THE SELECTED    │
│ CONTENT AND METADATA ASSOCIATED WITH THE RELEVANT ADDITIONAL│
│ CONTENT, WHERE THE PROGRAM CODE GENERATED THE METADATA BY   │
│ ANALYZING THE SELECTED CONTENT AND THE ADDITIONAL CONTENT   │
└─────────────────────────────────────────────────────────────┘
                              │
                              ▼
┌─────────────────────────────────────────────────────────────┐
│ PROGRAM CODE FROM ADDITIONAL CONTENT UPLOADED TO THE        │──430
│ STREAMING MEDIA PLATFORM BY A THIRD CLIENT. THE PROGRAM     │
│ CODE FACILITATES DISPLAYING OF THE SELECTED CONTENT AND     │
│ THE RELEVANT ADDITIONAL CONTENT, ON THE FIRST CLIENT        │
└─────────────────────────────────────────────────────────────┘
```

FIG. 4

VIDEO MEDIA CONTENT ANALYSIS

BACKGROUND

Online advertising through various online media and social media platforms is both a potentially large expense as well as a potentially profitable marketing outlet for advertisers, including retailers and manufacturers of products and services. To assist advertisers in identifying and targeting potential customers for receipt of advertising content, various online web platforms offer advertisers the ability to identify these potential customers utilizing demographic information related to a user. For example, if a user, when setting up an account on the platform, identifies as a male in his early twenties, this user can be designated to receive advertisements related to new video games being released. To protect the privacy of the user, the advertiser would select a group "male-identifying users in their early 20s" and target that group and the platform would deploy the content from the advertiser to users in this demographic. On popular type of platform for advertising is the streaming media platform (e.g., YouTube, Twitch, Netflix, Hulu, etc.). Many advertisers pay to have their advertisements appear before and/or during video content selected by a user for viewing. In addition to identifying viewers that are likely consumers of the products and services being advertised, advertisers also seek to prioritize videos that are relevant and inoffensive on which to place their advertisements. For example, placing an advertisement for a cosmetic to run in advance of a cartoon is likely not advantageous as a target customer for the video is not the same as the target customer for the advertisement. Given that advertising carries costs, advertisers desire to provide advertising content only to customers of platforms who will eventually become consumers of the good and services advertised.

SUMMARY

Shortcomings of the prior art are overcome and additional advantages are provided through the provision of a method for identifying additional content to display with selected content to a user of a streaming media platform. The method includes, for instance: obtaining, by one or more processors of a streaming media platform, a request, from a first client utilized by a user, to stream selected content of content uploaded to the streaming media platform, by a second client; identifying, by the one or more processors, a similarity between metadata associated with the selected content and metadata associated with relevant additional content selected from additional content uploaded to the streaming media platform, by a third client, wherein the metadata associated with the selected content and the metadata associated with the relevant additional content describe elements in the selected content and the relevant additional content identified, by the one or more processor, based on performing one or more content analyses of the selected content and the relevant additional content; selecting, by the one or more processors, the relevant additional content from additional content uploaded to the streaming media platform by a third client, to provide to the first client, with the selected content, based on the similarity; and displaying, by the one or more processors, the relevant additional content with the selected content on a viewer on the first client.

Shortcomings of the prior art are overcome and additional advantages are provided through the provision of a computer program product for identifying additional content to display with selected content to a user of a streaming media platform. The computer program product comprises a storage medium readable by a processing circuit and storing instructions for execution by the processing circuit for performing a method. The method includes, for instance: obtaining, by the one or more processors of a streaming media platform, a request, from a first client utilized by a user, to stream selected content of content uploaded to the streaming media platform, by a second client; identifying, by the one or more processors, a similarity between metadata associated with the selected content and metadata associated with relevant additional content selected from additional content uploaded to the streaming media platform, by a third client, wherein the metadata associated with the selected content and the metadata associated with the relevant additional content describe elements in the selected content and the relevant additional content identified, by the one or more processor, based on performing one or more content analyses of the selected content and the relevant additional content; selecting, by the one or more processors, the relevant additional content from additional content uploaded to the streaming media platform by a third client, to provide to the first client, with the selected content, based on the similarity; and displaying, by the one or more processors, the relevant additional content with the selected content on a viewer on the first client.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 is a workflow illustrating certain aspects of an embodiment of the present invention;

DETAILED DESCRIPTION

Figure 1:
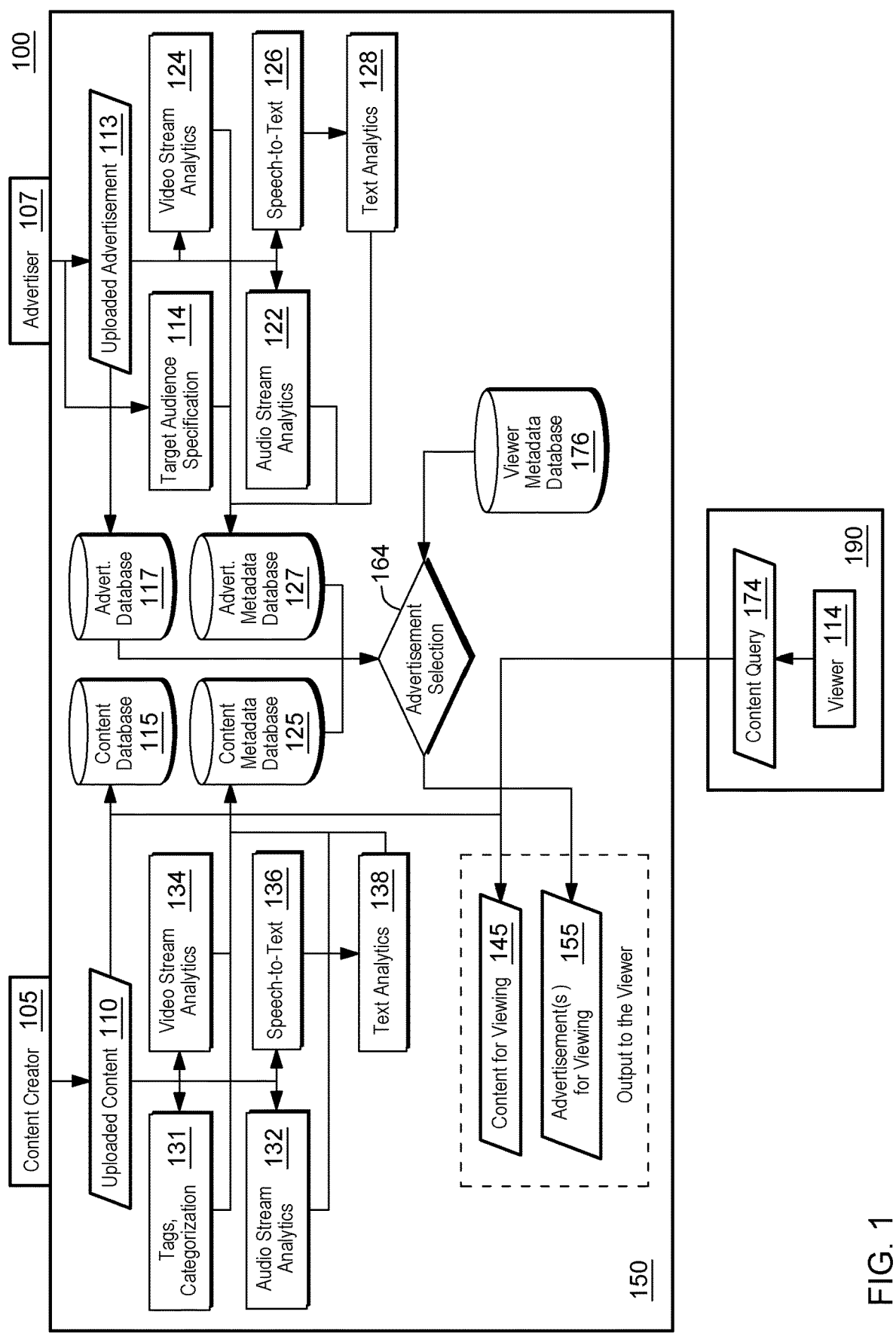
FIG. 1 is a technical environment into which certain aspects of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
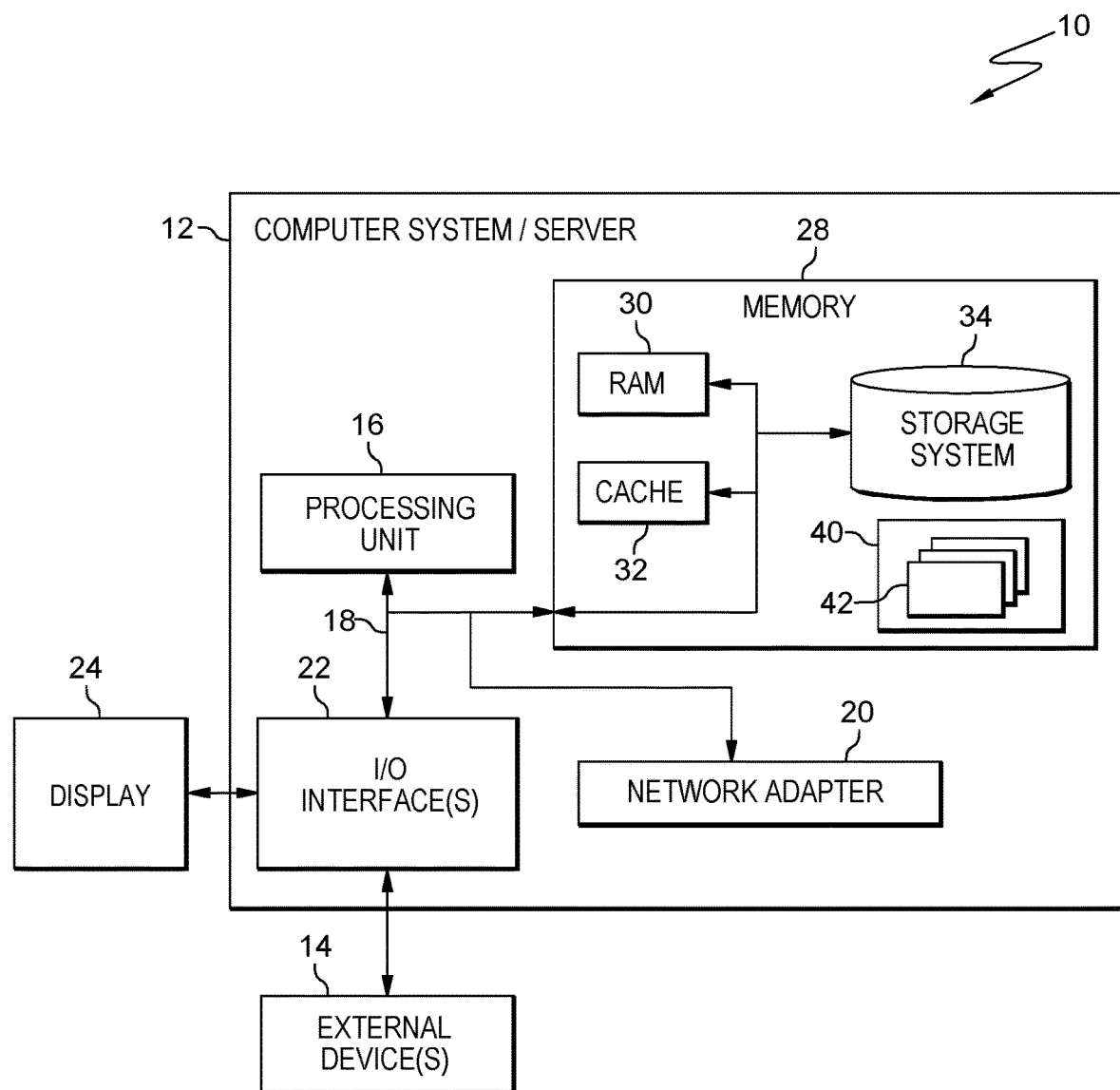
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include a computer-implemented method, a computer program product, and a computing system where program code executing on one or more processors deliver additional (e.g., commercial, advertising and/or marketing) content on a streaming platform based on a type of content purposely consumed (e.g., selected) by the user. For example, in some embodiments of the present invention, the additional content includes advertisements that are delivered to a user of a streaming platform before, during, and/or after a user views content that the user selected. Appropriately pairing additional content with selected content provides at least the following advantages, in streaming media platforms: 1) advertisements (additional content) are properly matched with content of interest; 2) age-appropriate advertisements are shown, to coordinate with the content; and/or 3) advertisers avoid showing potentially offensive content to potential consumers, as potentially offensive content is only paired with similar content, selected by potential consumers, and is thus less likely to offend. In embodiments of the present invention, rather than utilize (only) the demography of a user to select additional content to provide to a user of a streaming platform, together with selected content, in embodiments of the present invention, program code executing on at least one processor selects the additional content and provides this additional content to a user, with the selected content, based on analyzing and identifying visual and audio characteristics of the selected content (e.g., audio and/or video data stream) and the additional content (e.g., audio and/or video data stream). An advantage of this approach is that it guards the privacy of the user because rather than utilize (or exclusively utilize) personal or demographic information about the user to pair additional content with selected content, the program code coordinates additional content with content, based on the substance of the various content.

In some embodiments of the present invention, the program code: 1) obtains the selected content (e.g., audio/visual data stream) provided to the user on a streaming platform and identifies, within the selected content; 2) analyzes visual data to identify visual characteristics (e.g., objects being displayed, company logos, age-specific or demographic-appropriate content, age-specific or demographic-appropriate objects, etc.); and/or 3) analyzes audio data within the selected content to identify audio characteristics (e.g., pace and exuberance of speech, pace and/or tone/exuberance of music) and keywords indicative of content and characteristics of the content or context (e.g., performing a speech-to-text transcript and identifying subjects, tone/sentiment, appropriate audience for identified terms/keywords, etc.). In order to match selected content with additional content (e.g., advertisements, streaming audio data and/or video data), in embodiments of the present invention, the program code can perform the same analysis of the additional content as it performed on the selected content (i.e., analyze audio and visual characteristics). In some embodiments of the present invention, the program code stores the analysis of the additional content as metadata, along with metadata describing the additional content owner's target demographic, to facilitate matching of the additional content with the selected content being delivered to the user, on the streaming platform.

Aspects of various embodiments of the present invention are inextricably tied to computing and provide significant advantages over existing approaches to content and advertisement pairing on streaming media platforms. First, aspects of various embodiments of the present invention are inextricably tied to computing at least because these aspects operate on streaming media platforms, which serve streaming media to users, via the personal computing devices of the users. The streaming media platform is a digital content repository and embodiments of the present invention are directed to management of content of the digital repository, based on computerized cognitive analysis of this content. Second, some embodiments of the present invention provide advantages over existing approaches of pairing (and delivering) content selected by a user with additional content (e.g., advertising, etc.), to best target potential customers (e.g., subscribers to the platform who are most likely to buy the goods and/or services promoted in the additional content) because rather than rely upon demographics provided by a user when signing up for a service, tags provided by a content provider, and a target specification provided by an advertiser, to coordinate selected content with additional content, embodiments of the present invention analyze content selected and actually viewed by a user, as well as additional content, in order to coordinate additional content with selected content. Thus, in embodiments of the present invention, rather than target additional content to a user of a streaming platform based on determining the demographics of the user, program code in embodiments of the present invention analyzes the content selected by the user (e.g., streaming audio and/or video data) and facilitates the platform providing additional content to users who view selected content that coordinates with the additional content. While many existing approaches gather demographic and personal information available about a user to target advertising to the user, embodiments of the present invention improve the security of user-related data because the targeting of advertising is focused on content viewed by the user, rather than any personal information about the user.

FIG. 1 is a technical environment 100 into which various aspects of the present invention can be implemented. For ease of understanding and illustrative purposes only, certain functionalities of the program code are separated into modules. As understood by one of skill in the art, these functionalities can be separated and/or combined into one or more programs executing on at least one processor, in various embodiments of the present invention. In the technical environment 100 of FIG. 1, various modules of the program code execute on processing circuits of one or more computing resources of a streaming media platform 150. Program code executing on the one or more computing resources 150 obtains uploaded content 110, which becomes the content selected by a user for viewing via a viewer 114 (e.g., graphical user interface (GUI)) or a personal computing resource 190 of the user, from a content creator 105. The content creator 105 comprises one or more computing resources utilized in upload the uploaded content 110 to the streaming media platform, via a wired and/or wireless communications connection (including the Internet). The content creator 105 can also upload tags and categorization 131 for the uploaded content 110, which can be represented by meta-data in the file and/or in related files. An advertiser 107 uploads content as well, referred to as uploaded advertisements 113, which are an examples of additional content, to the one or more computing resources of a streaming media platform 150. In some embodiments of the present invention, with the uploaded advertisements 113, the advertiser 107 also optionally uploads a target audience specification 114 with each advertisement of the uploaded advertisements 113, such that the program code obtains data to assist in targeting users who comprise an appropriate audience for each of the uploaded advertisements 113. The advertiser 107 is comprised of one or more computing resources. A single advertiser 107 and a single content creator 105 are depicted in FIG. 1 for illustrative purposes only, as the technical environment 100 of FIG. 1 and the social media platform 150 can be utilized by multiple content and advertisement providers, who can all supply streaming content. In some embodiments of the present invention, the program code stores the uploaded content 110 in a content database 115 (which can be comprised of one or more of the computing resources of the streaming media platform 150) and the program code stores the uploaded advertisements 113 in a advertising database 117 (which can be comprised of one or more of the computing resources of the streaming media platform 150). In some embodiments of the present invention, the content database 115 and the advertising database 117 can reside on one or more of the same computing resources of the streaming media platform 150.

As aforementioned, in embodiments of the present invention, program code executing on one or more processors of streaming media platform 150 matches selected content (e.g., uploaded content 110) with additional content (e.g., uploaded advertisements 113) on a streaming media platform 150, and facilitates the streaming media platform 150 providing the matched types of content together, when a user opts to receive the selected content, for example, on a personal computing resource 190. For example, user can utilize a personal computing resource 190 to select to view a video served by the streaming media platform 150. A user can select the content through a viewer 114, and one or more programs executing on the personal computing resource 190 executes a content query 174, behind the scenes. Before viewing the video, the program code in an embodiment of the present invention facilitates the streaming media platform 150 providing additional content (e.g., an advertisement) that the program code matched to this video. The user views both the selected content and the additional content on the personal computing resource 190 in a viewer 114. In embodiments of the present invention, the program code can select the matched additional content on-the-fly or based on historical data related to the additional content and the selected content.

In some embodiments of the present invention, program code executing on one or more computing resources of the streaming media platform 150 analyzes content and context of the uploaded content 110 and the uploaded advertisements 113. For ease of understanding, the aspects of this analysis are illustrated as separate, asynchronous, processes. However, the same programs can perform both analyses and the analyses can be performed in parallel. In general, the program code analyzes uploaded content 110 and the uploaded advertisements 113 in order to identify uploaded content 110 relevant to one or more uploaded advertisements 113 and vice versa.

In some embodiments of the present invention, program code executing on one or more computing resources of the streaming media platform 150 performs various analyses on uploaded content 110 (e.g., accessing the uploaded content 110 as saved in the content database 115), including but not limited to: 1) generating video stream analytics 134 based on analyzing a video stream of content selected for viewing or previously viewed, by the user, from the uploaded content 110, utilizing image recognition to identify features of possible interest to advertisers; 2) generating audio stream analytics 132 based on analyzing an audio stream of content selected for viewing or previously viewed, by the user, from the uploaded content 110, utilizing contextual and cognitive analysis tools to identify tone and/or emotional content of the audio stream; and/or 3) generating text analytics 138 based on analyzing text of content selected for viewing or previously viewed, by the user, from the uploaded content 110, utilizing to identify one or more of informational content, tone and/or emotional content. Program code can include (or utilize) a speech-to-text 136 program to convert audio of uploaded content 110 to text, for analysis, by the text analytics 138. As noted in FIG. 1, if available, the analysis of the video stream by the program code can be informed by tags and categorization 131 uploaded in and/or with the uploaded content 110. In some embodiments of the present invention, the program code retains the results of these analyses as metadata in the content metadata database 125. Thus, the program code retains not only the uploaded content 110, in a content database 115, but also the metadata analysis results, in a content metadata database 125. For ease of understanding, the content database 115 and the content metadata database 125 are depicted as separate entities, but as understood by one of skill in the art, these resources can reside of one or more of the same computing resources as well as on one or more different computing resources of the streaming media platform 150.

In some embodiments of the present invention, program code executing on one or more computing resources of the streaming media platform 150 performs various analyses on uploaded advertisements 113, (e.g., accessing the uploaded advertisements 113 as saved in the advertisement database 117) including but not limited to: 1) generating video stream analytics 124 based on the uploaded advertisements 113; 2) generating audio stream analytics 122 based on analyzing an audio stream of the uploaded advertisements 113, utilizing contextual and cognitive analysis tools to identify tone and/or emotional content of the uploaded advertisements 113; and/or 3) generating text analytics 128 based on analyzing text of the uploaded advertisements 113, to identify one or more of informational content, tone and/or emotional content. Program code can include (or utilize) a speech-to-text 126 program to convert audio of uploaded advertisements 113 to text, for analysis, by the text analytics 128. As noted in FIG. 1, if available, the analysis of the uploaded advertisements 113 can be informed by related target audience specifications 114. In some embodiments of the present invention, the program code retains the results of these analyses as metadata in an advertisement metadata database 127. Thus, the program code retains not only the uploaded advertisements 113, in an advertisement database 117, but also the metadata analysis results, in an advertisement metadata database 127. As understood by one of skill in the art, these databases can be separate or combined entities and can also be separate or combined, one various computing resources, with the content database 115 and the content metadata database 125.

In some embodiments of the present invention, program code executing on one or more processors of the streaming media platform 150, utilizes aspects, including Application Program Interfaces (APIs), of an existing cognitive analysis tools to perform these analyses of one or more of the uploaded content 110 and the uploaded advertisements 113. Some embodiments of the present invention utilize IBM Watson® as a cognitive agent to perform one or more of the described analyses. IBM Watson® is a product of International Business Machines Corporation. IBM Watson® is a registered trademark of International Business Machines Corporation, Armonk, N.Y., US. IBM Watson® is an example of one cognitive agent which includes a set of APIs that can be utilized in some embodiments of the present invention, but are offered merely for illustrative purposes and not to suggest any limitations. One of skill in the art will comprehend that embodiments of the present invention can utilize a variety of cognitive agents as well as a variety of APIs in order to practice various aspects describes.

In some embodiments of the present invention, the program code interfaces with IBM Watson® APIs to perform analyses of the data (e.g., audio and video data streams of the uploaded content 110 and the uploaded advertisements 113). APIs of IBM Watson® that can be utilized in various embodiments of the present invention to perform the described analyses include, but are not limited to, natural language classifiers, Retrieve and Rank (i.e., a service available through the IBM Watson® Developer Cloud that can surface the most relevant information from a collection of documents), Tone Analyzer, concepts/visual insights, trade off analytics, document conversion, relationship extraction, natural language processing, text to speech capabilities, and/or translation.

As aforementioned, in embodiments of the present invention, program code executed by one or more resources of a streaming media platform 150 analyzes content of a video stream associated with both the uploaded content 110 and the uploaded advertisements 107 (e.g., video stream analytics 124 134). Features of this analysis can include, but are not limited to the program code: 1) performing object recognition, including identifying repeating images (e.g., cars, consumer products, types of food, company logos, landmarks, etc.); and/or 2) detecting the inclusion of objects (e.g., related to topics) that would limit the appropriate audience for the content (e.g., offensive and/or potentially divisive iconography or topics, and/or images more suited to more mature audiences (e.g., products with age limitations associated with use)). The program code produces metadata as a result of analyzing each example of content and associates the metadata with its respective content.

As aforementioned, in embodiments of the present invention, program code executed by one or more resources of a streaming media platform 150 analyzes content of an audio stream associated with both the uploaded content 110 and the uploaded advertisements 107 (e.g., audio stream analytics 122 132). Features of this analysis can include, but are not limited to the program code: 1) applying emotional analytics (e.g., via a cognitive analysis agent) to voices of speakers including on the audio to detect one or more sentiments expressed tonally (e.g., passion, anger, boredom, happiness, etc.); and/or 2) identifying any background music based on tonality (e.g., orchestral music, heavy metal music, rock music, easy listening music, uplifting music, calming music, etc.). The program code produces metadata as a result of analyzing each example of content and associates the metadata with its respective content.

As aforementioned, in embodiments of the present invention, program code executed by one or more resources converts speech included in the uploaded content 110 and the uploaded advertisements 107 to from speech-to-text 126 136 (e.g., utilizing an existing speech-to-text conversion API) and analyzes the resultant text (e.g., text analytics 128 138). Features of this analysis can include, but are not limited to the program code: 1) identifying keywords in the text, where the keywords are indicative of the content of the uploaded content 110 and/or the uploaded advertisements 107, and/or the context of the uploaded content 110 and/or the uploaded advertisements 107; 2) inferring tone/sentiment from the textual content; 3) identifying the absence and/or presence of terms that would potentially limit the appropriate audience for the content (e.g., mature subject matter, profanity, offensive and/or potentially divisive topics, mentions of products or services with age limitations associated with use, etc.). The program code produces metadata as a result of analyzing each example of content and associates the metadata with its respective content.

In differing implementations of embodiments of the present invention, the program code can store a variety of metadata associated with uploaded content 110, in a content metadata database 125, and uploaded advertisements 113, in an advertisement metadata database 127. Metadata generated, based on the described analyses, and stored, by the program code, in one or more of the advertisement metadata database 127 and/or the content metadata database 125 (which can reside on the same or different physical or virtual computing resources of the streaming media platform 150), can include, but is not limited to: 1) one-dimensional scales (e.g., age-appropriateness, controversy, amount/severity of problematic language); 2) two-dimensional scales (e.g., energy (calm vs. frenetic), disgust vs. joy, and optimism vs. pessimism); 3) general keywords, including identified topics of conversation (e.g., mathematics, video games, political topics, etc.) and the presence of general images (e.g., cars, forests, gaming controllers, etc.); and/or 4) topical keywords identified by the program code based on imagery and speech specific to potential advertisers (e.g., presence of company logos), or specific topics (e.g., religious or cultural discussions or iconography, etc.).

As depicted in FIG. 1, in embodiments of the present invention, a user connects to a streaming service utilizing a personal computing resource 190. Content from the service is served to a viewer 114, on the personal computing resource 190, by one or more computing resources of a streaming media platform 150. The user, via the personal computing resource 190 requests content from the streaming media platform 150, via a content query 174, executed by an application that connects the user to the streaming media platform 150. Responsive to entry by a user on the personal computing device 190 (e.g., via a GUI), program code executing on one or more resources of the streaming media platform 150 obtains a content query 174. The content query 174 specifies content for viewing 145 from the uploaded content 110, housed in the content database 115. In advance of displaying the content for viewing 145, the program code selects one or more advertisements for viewing 155, from the advertisement database 117. The program code completes this advertisement selection 164 by identifying an uploaded advertisement 113 with metadata, as available in the advertisement metadata database 127, which is has metadata that is similar to or compatible with metadata associated with the selected content for viewing 145. The program code can perform this analysis and selection in real-time and/or, at upload of the uploaded content 110 and the uploaded advertisements 113, such that once content for viewing 145 is selected by the user, though the personal computing device 190, via a content query 174, the program code can pull results for previously performed analyses. However, based on selecting advertisement for viewing 145 compatible with the content for viewing 155, selected by the user, the program code outputs both the advertisement for viewing 145 and the content for viewing 155, for playing in the viewer 114 on the personal computing device 190. Depending upon the streaming media platform 150, the program code can play the advertisement for viewing 145 in full or in part and it can position the advertisement for viewing 145 before, during, and/or after the selected content for viewing 155.

In some embodiments of the present invention, based on a user selecting content for viewing 145 available via a streaming media platform 150, via a personal computing device 190 communicatively coupled to one or more computing resources of the streaming media platform 150, the program code obtains the metadata of the selected content for viewing 145 (e.g., from the content metadata database 125). The content metadata can include, but is not limited to, features and keywords extracted from video and audio stream analysis. If available, the program code also obtains user metadata, such as demographics, which the program code obtained when the user subscribed to the streaming media service 150. The program code selects one or more advertisements for potential viewing with the selected content for viewing 145, based on keyword matching. The program code determines a distance between features (per the metadata) of the content for viewing 145 and the features of each potential advertisement (e.g., based on the metadata for each advertisement in the advertisement metadata database 127). The program code selects an advertisement with the closest distance as an advertisement for viewing 155 with the selected content for viewing 145. In some embodiments of the present invention, the program code determines the closest distance based, at least in part, on parameters of the streaming media platform 150 (e.g., to ensure that the same advertisement is not repeated ad infinitum, and to ensure that a particular advertiser's advertisement receives any contractually-obligated playtime, etc.).

The program code matches one or more advertisements for viewing 155 with the content for viewing 145 selected by the user. For example, a user can select a content for viewing 145 that depicts racecar races narrated by an enthusiastic announcer. Based on this selection, the program code can make an advertisement selection 164 of an advertisement for viewing 155 that includes an advertisement for motor oil with an enthusiastic sales pitch that accentuates that use of the product can increase the performance of a car. In another example, the user can select a content for viewing 145 that includes a cartoon bear singing a lullaby. Based on this selection, the program code can make an (automatic) advertisement selection 164 of an advertisement for viewing 155 that includes a nightlight integrated into a stuffed animal and the audio includes calming orchestral music. In some embodiments of the present invention, the program code retains metadata associated with content for viewing 145 selected by a user. Thus, when the program code makes an advertisement selection 164 of an advertisement for viewing 155, the program code can select the advertisement for viewing 155 based on the compatibility of the metadata associated with this advertisement with not only the most recent content for viewing 145 selected by the user, but also, with historical uploaded content 110, as retained as metadata in a viewer metadata database 176, selected by the user, for viewing. Thus, the program code selects uploaded advertisements 113 and renders them advertisements for viewing 155, together with content for viewing 145, selected by the user, based on what the user is currently looking to view in addition to what content the user has viewed in the past, in the viewer 114.

Figure 2:
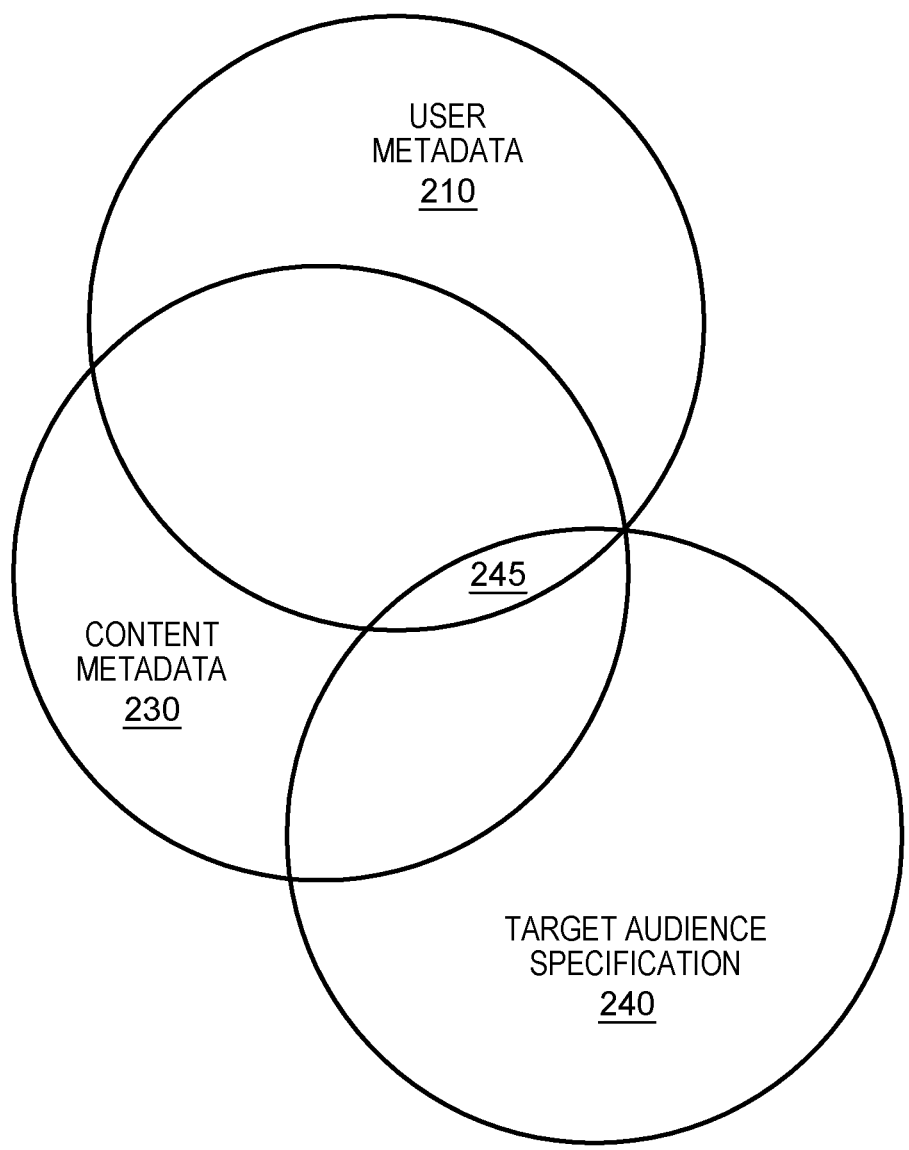
FIG. 2 is an illustration of aspects considered in existing systems for assigning additional content to selected content.
Figure 3:
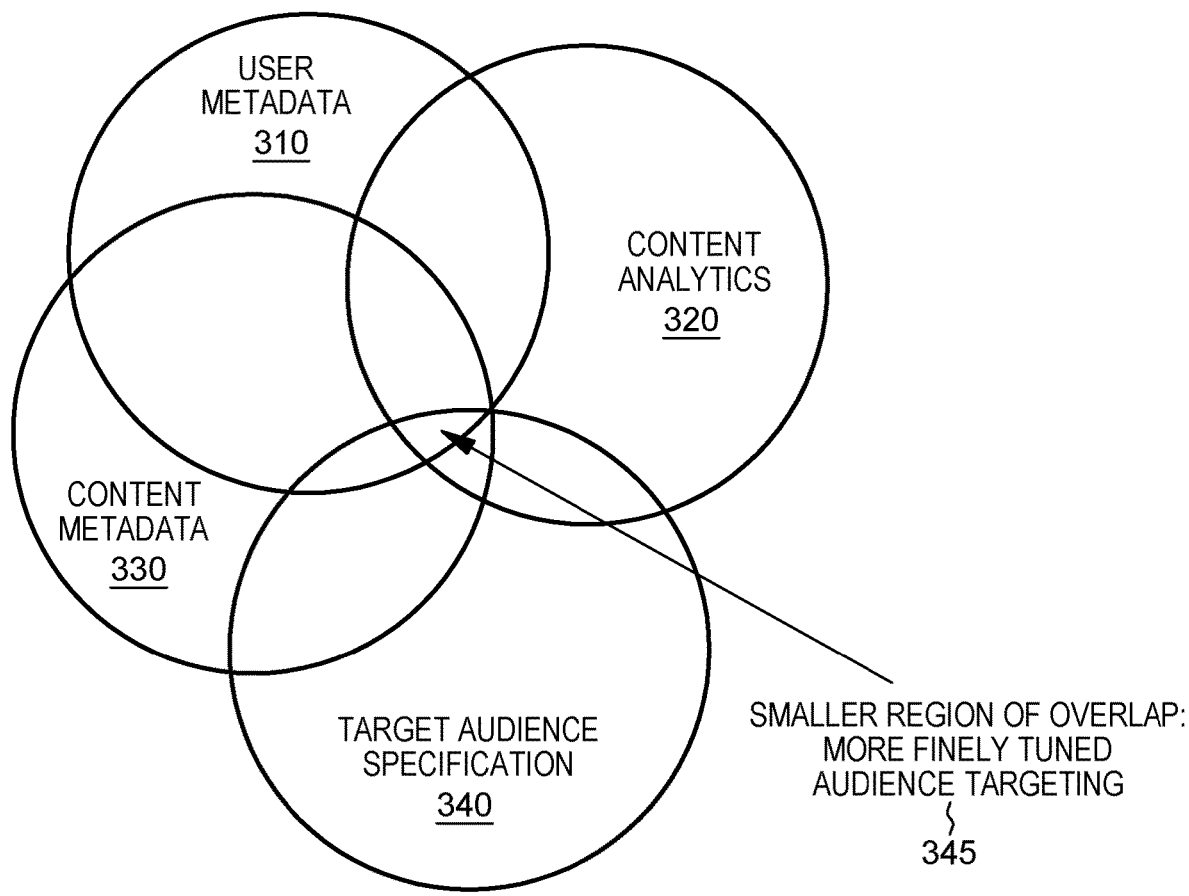
FIG. 3 is an illustration of aspects considered in some embodiments of the present invention when assigning additional content to selected content.

FIGS. 2 and 3 demonstrate how the content analysis of the selected content (e.g., uploaded content 110, FIG. 1) and the additional content (e.g., uploaded advertisements 113, FIG. 1) enable the program code to coordinate more relevant additional content with selected content, for viewing by a user of a streaming media platform, than in the absence of the content analysis. FIG. 2 demonstrates how user program code in existing systems can utilize user metadata 210 (i.e., demographics offered when a user signs up for a streaming service), content metadata 220 (i.e., tags and categorization (FIG. 1, 131) of uploaded content provided by content creators), and a target audience specification 230 (i.e., target audience specifications (FIG. 1, 114) provided by advertisers with uploaded advertisements), to identify an overlap 245 that it can utilize to coordinate additional content (advertisements) with selected content. Meanwhile, FIG. 3 illustrates how in some embodiments of the present invention, the program code can further refine a targeting provided by user metadata 310, content metadata 330, and target audience specifications 340, by adding the content analytics 320 provided by the program code in embodiments of the present invention. Thus, although in some embodiments of the present invention, the program code selects additional content to provide with selected content based on the analytics discussed in FIG. 1, alone, in some embodiments of the present invention, the program code utilizes these analytics in concert with analytics utilized in existing streaming media platforms, providing a significant enhancement to these systems based on increasing targeting accuracy.

FIG. 4 is a general workflow 400 that illustrates certain aspects of some embodiments of the present invention. In some embodiments of the present invention, program code executing on one or more processors on a streaming media platform obtains a request from a first client utilized by a user, to stream selected content of content uploaded to the streaming media platform by a second client (410). Based on obtaining the request, the program code selects relevant additional content from additional content uploaded to the streaming media platform by a third client, to provide to the first client, with the selected content, based on the program code identifying a similarity between metadata associated with the selected content and metadata associated with the relevant additional content, where the program code generated the metadata by analyzing the selected content and the additional content (420). In some embodiments of the present invention, the relevant additional content is selected by the program code from additional content uploaded to the streaming media platform by a third client. The program code facilitates displaying of the selected content and the relevant additional content, on the first client (430).

Figure 5:
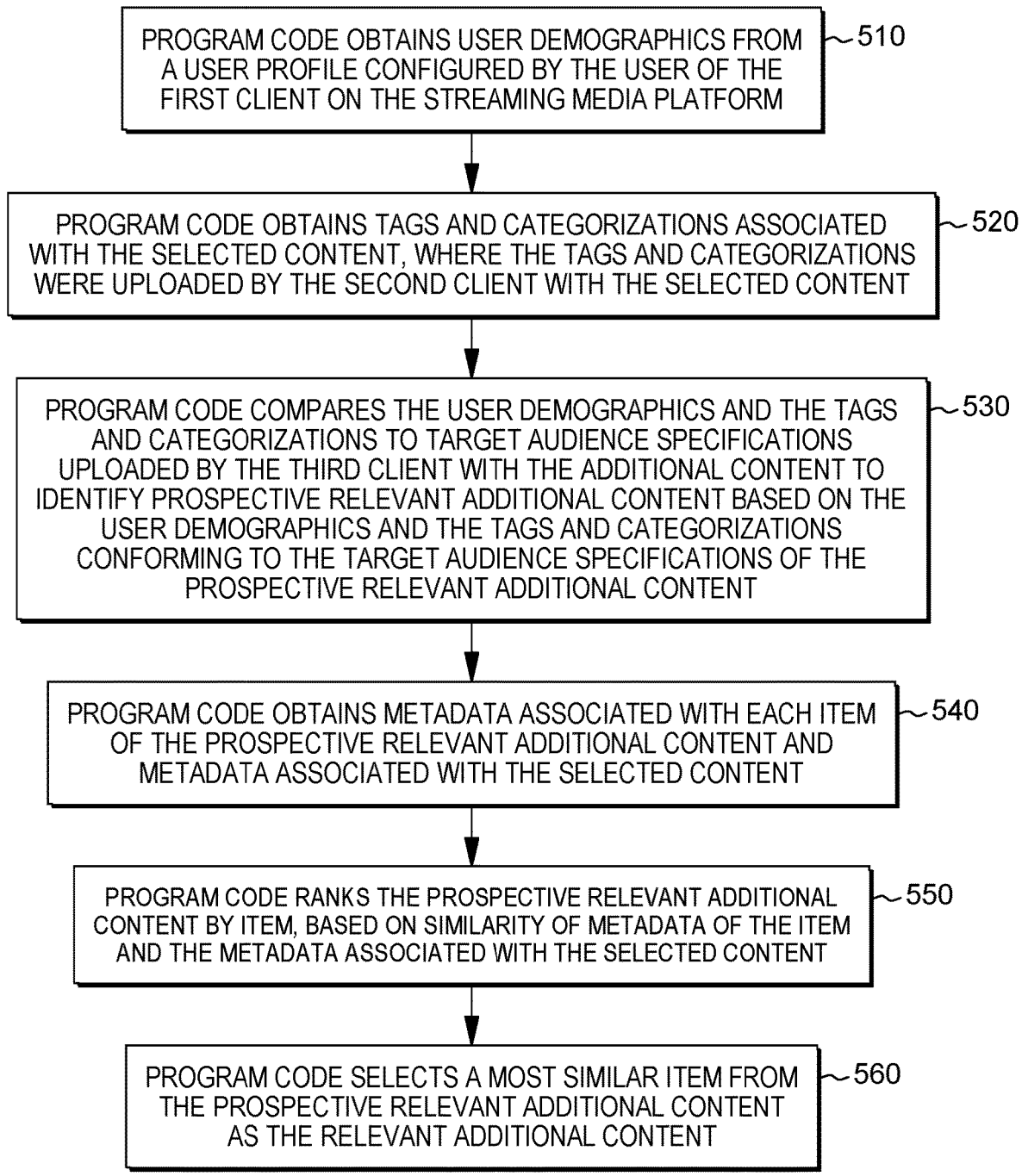
FIG. 5 is a workflow illustrating certain aspects of an embodiment of the present invention.

FIG. 5 is a specific workflow 500 that illustrates aspects of the program code selecting relevant additional content to provide to the first client, with the selected content (e.g., FIG. 4, 420), in some embodiments of the present invention. In some embodiments of the present invention, based on obtaining the request, the program code obtains user demographics from a user profile configured by the user of the first client on the streaming media platform (510). The program code obtains tags and categorizations associated with the selected content, where the tags and categorizations were uploaded by the second client with the selected content (520). The program code compares the user demographics and the tags and categorizations to target audience specifications uploaded by the third client with the additional content to identify prospective relevant additional content based on the user demographics and the tags and categorizations conforming to the target audience specifications of the prospective relevant additional content (530). Based on identifying the prospective relevant additional content, the program code obtains metadata associated with each item of the prospective relevant additional content and metadata associated with the selected content (540). The program code ranks the prospective relevant additional content by item, based on similarity of metadata of the item and the metadata associated with the selected content (550). The program code selects a most similar item from the prospective relevant additional content as the relevant additional content (560).

Figure 6:
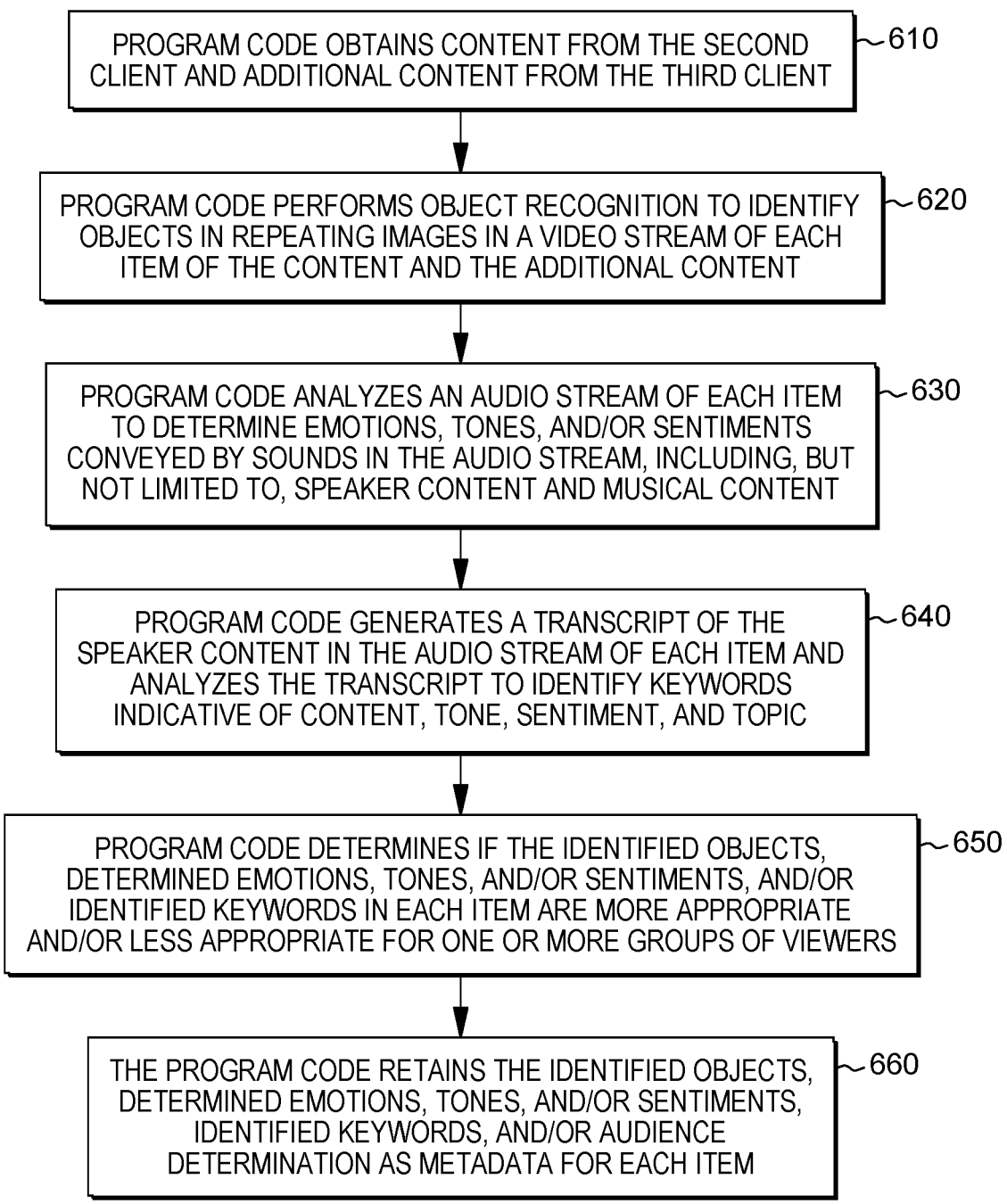
FIG. 6 is a workflow illustrating certain aspects of an embodiment of the present invention.

FIG. 6 is a workflow 600 that illustrates aspects of the program code generating the metadata associated with the uploaded content and the additional (uploaded) content, which the program code utilizes to select additional content to deliver with selected content, to a user, via the first client. In some embodiments of the present invention, program code obtains content from the second client and additional content from the third client (610). As discussed in FIG. 1, the second client can be utilized by a content creator, while the third client can be utilized by an advertiser and the additional content includes advertisements. The analysis described herein, which is performed by the program code on the content and the additional content, can be performed in parallel, consecutively, asynchronously, simultaneously, etc. The analysis can also be performed responsive to obtaining the content and/or additional content and/or responsive to obtaining a request from the first client, utilized by a user, to stream selected content of content uploaded to the streaming media platform by the second client (e.g., FIG. 4, 410). For each item of content obtained by the program code, from the content and the additional content: the program code performs object recognition to identify objects in repeating images in a video stream of the item (620); the program code analyzes an audio stream of the item to determine emotions, tones, and/or sentiments conveyed by sounds in the audio stream, including, but not limited to, speaker content and musical content (630); the program code generates a transcript of the speaker content in the audio stream of the item and analyzes the transcript to identify keywords indicative of content, tone, sentiment, and topic (640); the program code determines if the identified objects, determined emotions, tones, and/or sentiments, and/or identified keywords are more appropriate and/or less appropriate for one or more groups of viewers (e.g., the program code determines if the objects recognized are relevant to any audience-limiting topics) (650); the program code retains the identified objects, determined emotions, tones, and/or sentiments, identified keywords, and/or audience determination as metadata for the item (660).

Embodiments of the present invention include a computer-implemented method, a computer program product, and a computer system, where program code executed by one or more processors of a streaming media platform obtains a request, from a first client utilized by a user, to stream selected content of content uploaded to the streaming media platform, by a second client. The program code identifies a similarity between metadata associated with the selected content and metadata associated with relevant additional content selected from additional content uploaded to the streaming media platform, by a third client, wherein the metadata associated with the selected content and the metadata associated with the relevant additional content describe elements in the selected content and the relevant additional content identified, by the one or more processor, based on performing one or more content analyses of the selected content and the relevant additional content. The program code selects the relevant additional content from additional content uploaded to the streaming media platform by a third client, to provide to the first client, with the selected content, based on the similarity. The program code displays the relevant additional content with the selected content on a viewer on the first client.

In some embodiments of the present invention, the program code identifies the similarity by obtaining, user demographics, from a user profile configured by the user of the first client on the streaming media platform, by obtaining tags and categorizations associated with the selected content, wherein the tags and categorizations were uploaded by the second client, to the streaming media platform, with the selected content, identifying one or more items of prospective relevant additional content from the additional content, based on comparing the user demographics and the tags and categorizations to target audience specifications uploaded by the third client with the additional content and determining that the user demographics and the tags and categorizations conform to the target audience specifications of the prospective relevant additional content, obtaining, metadata associated with each item of the prospective relevant additional content and metadata associated with the selected content, and identifying an item comprising the relevant additional content from the prospective relevant additional content, based on identifying, the similarity between metadata associated with the selected content and metadata associated with relevant additional content. In some embodiments of the present invention, the program code identifies the item comprising the relevant additional content from the prospective relevant additional content by ranking, the prospective relevant additional content by item, based on level of similarity of metadata of the item and the metadata associated with the selected content, and identifying, the item comprising the relevant additional content as comprising the similarity, based on selecting an item from the prospective relevant additional content with a highest level of similarity as the item comprising the relevant additional content. The highest level of similarity can be defined by one or more business rules of the social media platform.

In some embodiments of the present invention, the program code obtains the content from the second client and the additional content from the third client. The program code generates metadata associated with each item of the content and of the additional content, wherein each items comprises an audio stream and a video stream, wherein generating the metadata for each item includes: the program code performing object recognition to identify objects in repeating images in the video stream of an item, the program code analyzing the audio stream of the item to determine characteristics conveyed by sounds in the audio stream in the audio stream selected from the group consisting of: emotion, tone, and sentiment, the program code generating a transcript of speaker content comprising the audio stream of the item, the program code performing a textual analysis of the transcript to identify keywords in the transcript indicative of characteristics of the text selected from the group consisting of: content, tone, sentiment, and topic, and the program code retaining the repeating images, characteristics conveyed by sounds in the audio stream, and characteristics of the text as the metadata associated with the item.

In some embodiments of the present invention, the program code generates the metadata for each item further by cognitively analyzing the metadata associated with the item to determine if any item of the metadata is more appropriate or less appropriate for one or more groups of viewers, and updating the metadata associated with the item to reflect the determination. The sounds in the audio stream can comprise the speaker content and musical content.

In some embodiments of the present invention, the program code analyzing the audio stream of the item to determine the characteristics conveyed by sounds in the audio stream comprises the program code analyzing the speaker content and the musical content to identify audio characteristics selected from the group consisting of: pace of speech, exuberance of speech, pace of music, and tone of music.

In some embodiments of the present invention, the program code utilizes an application programming interface of a cognitive agent to perform an aspect selected from the group consisting of: performing object recognition, analyzing the audio stream, generating the transcript, and performing the textual analysis.

In some embodiments of the present invention, the objects in the repeating images identified are selected from the group consisting of: consumer products, company logos, types of food, landmarks, symbols, icons, people, and animals.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the content creator 105 (FIG. 1), the advertiser 107 (FIG. 1), the personal computing device 190 (FIG. 1), and any or all of the one or more computing resources on the streaming media platform 150 (FIG. 1), can each be understood as a cloud computing node 10 (FIG. 7) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
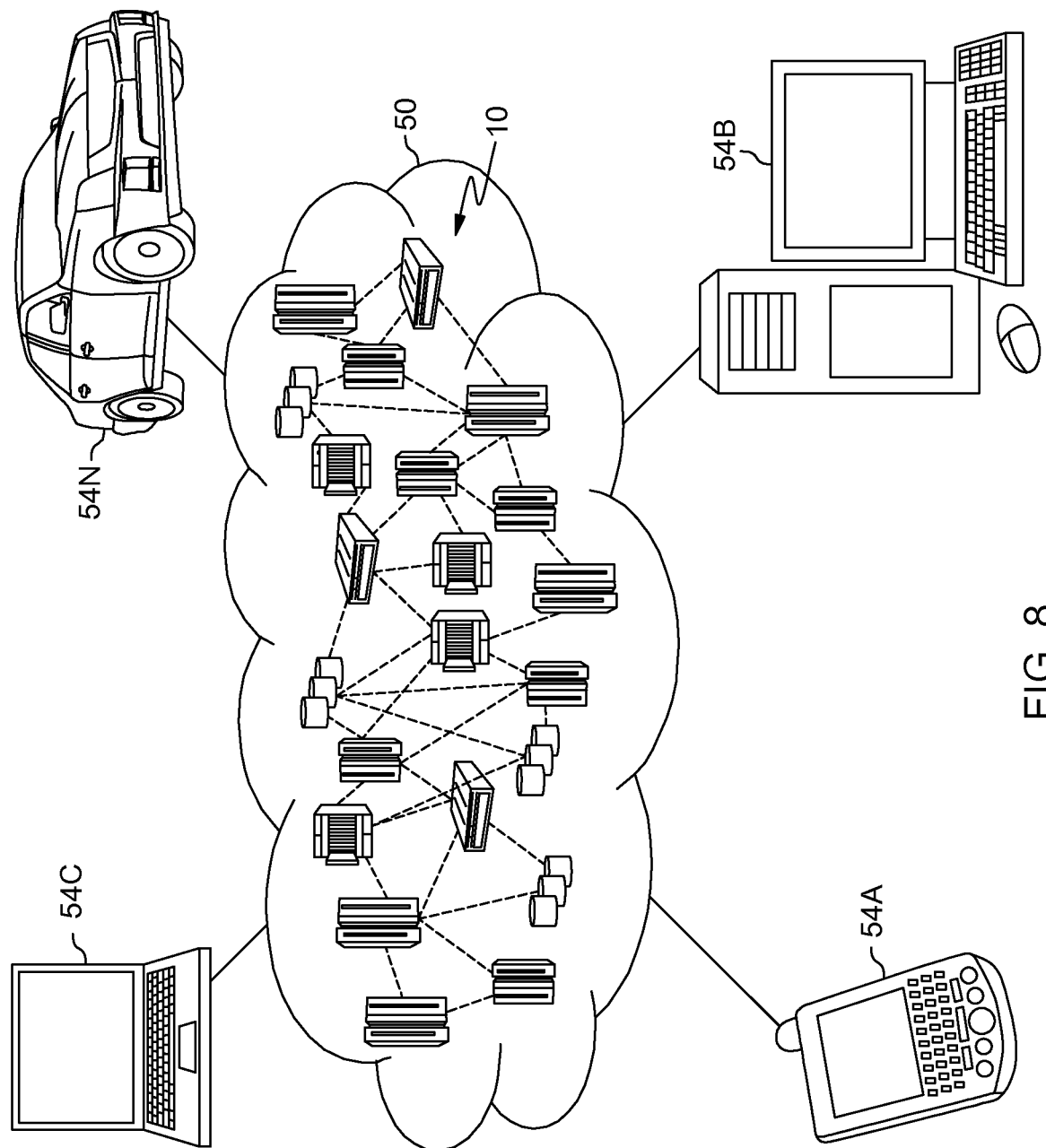
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
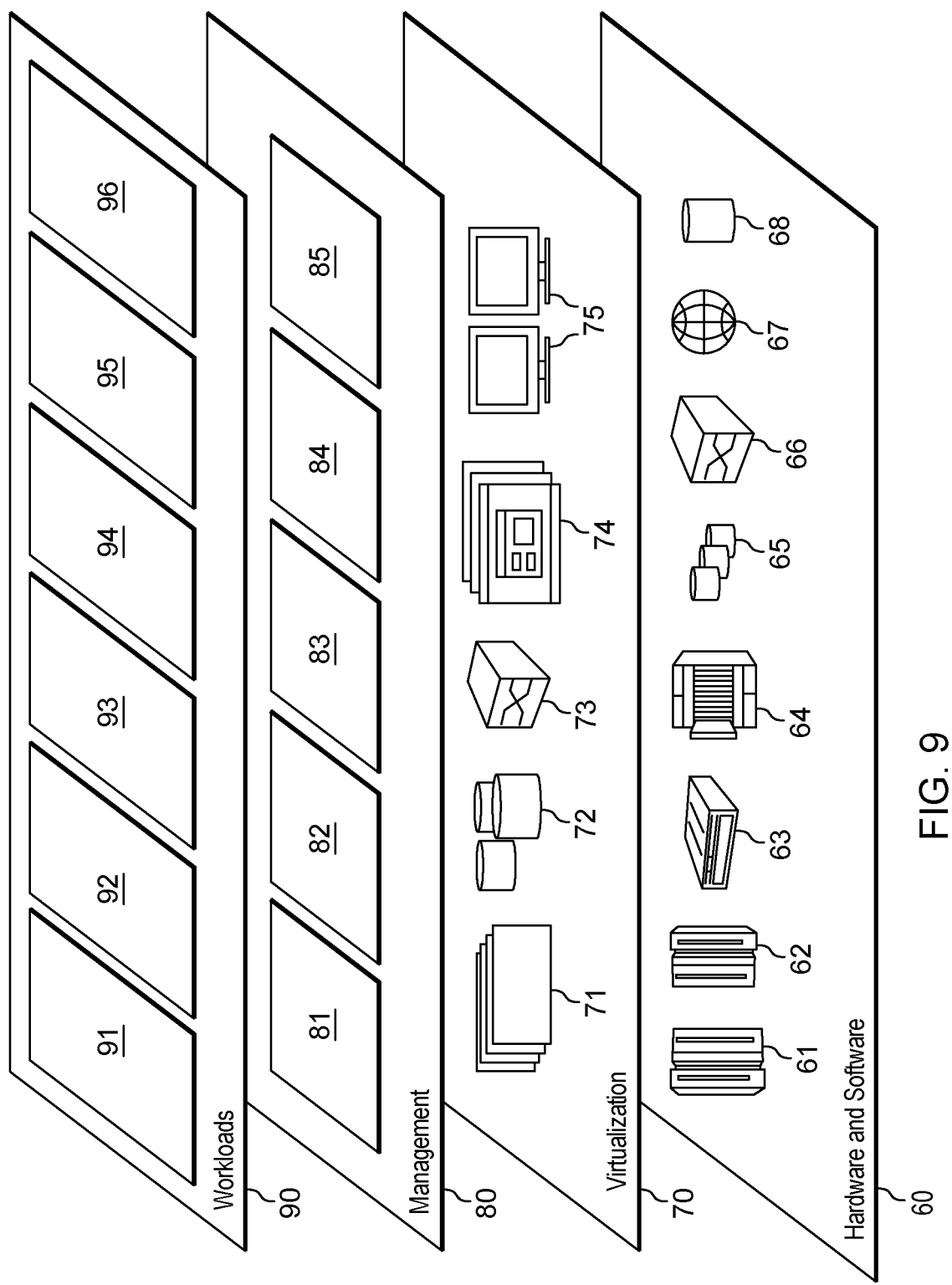
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating display of coordinated content with additional content on a streaming media platform 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors of a streaming media platform, a request, from a first client utilized by a user, to stream selected content of content uploaded to the streaming media platform by a second client, wherein the uploaded content comprises one or more items;
    identifying, by the one or more processors, a similarity between metadata associated with the selected content and metadata associated with relevant additional content selected from additional content uploaded to the streaming media platform by a third client, wherein the uploaded additional content comprises one or more items, wherein the metadata associated with the selected content and the metadata associated with the relevant additional content describe elements in the selected content and the relevant additional content identified, by the one or more processor, based on performing one or more content analyses of the selected content and the relevant additional content;
    selecting, by the one or more processors, the relevant additional content from the additional content uploaded to the streaming media platform by a third client to provide to the first client with the selected content based on the similarity;
    obtaining, by the one or more processors, the content from the second client and the additional content from the third client;
    generating, by the one or more processors, metadata associated with each item of the content and of the additional content, wherein each item comprises an audio stream and a video stream, and wherein generating the metadata for each item comprises:
        performing, by the one or more processors, object recognition to identify objects in repeating images in the video stream of an item;
        analyzing, by the one or more processors, the audio stream of the item to determine characteristics conveyed by sounds in the audio stream in the audio stream selected from the group consisting of: emotion, tone, and sentiment;
        generating, by the one or more processors, a transcript of speaker content comprising the audio stream of the item;
        performing, by the one or more processors, a textual analysis of the transcript to identify keywords in the transcript indicative of characteristics of the text selected from the group consisting of: content, tone, sentiment, and topic; and
        retaining, by the one or more processors, the repeating images, characteristics conveyed by sounds in the audio stream, and characteristics of the text as the metadata associated with the item.

2. The computer-implemented method of claim 1, wherein identifying the similarity further comprises:
    obtaining, by the one or more processors, user demographics, from a user profile configured by the user of the first client on the streaming media platform;
    obtaining, by the one or more processors, tags and categorizations associated with the selected content, wherein the tags and categorizations were uploaded by the second client, to the streaming media platform, with the selected content;
    identifying, by the one or more processors, one or more items of prospective relevant additional content from the additional content, based on comparing the user demographics and the tags and categorizations to target audience specifications uploaded by the third client with the additional content and determining that the user demographics and the tags and categorizations conform to the target audience specifications of the prospective relevant additional content;

obtaining, by the one or more processors, metadata associated with each item of the prospective relevant additional content and metadata associated with the selected content; and identifying, by the one or more processors, an item comprising the relevant additional content from the prospective relevant additional content, based on identifying, the similarity between metadata associated with the selected content and metadata associated with relevant additional content.

3. The computer-implemented method of claim 2, wherein identifying the item comprising the relevant additional content from the prospective relevant additional content further comprises:

ranking, by the one or more processors, the prospective relevant additional content by item, based on level of similarity of metadata of the item and the metadata associated with the selected content; and identifying, by the one or more processors, the item comprising the relevant additional content as comprising the similarity, based on selecting an item from the prospective relevant additional content with a highest level of similarity as the item comprising the relevant additional content.

4. The computer-implemented method of claim 3, wherein the highest level of similarity is defined by one or more business rules of a social media platform.

5. The computer-implemented method of claim 1, further comprising:

displaying, by the one or more processors, the relevant additional content with the selected content on a viewer on the first client.

6. The computer-implemented method of claim 1, wherein the sounds in the audio stream comprise the speaker content and musical content.

7. The computer-implemented method of claim 6, wherein analyzing the audio stream of the item to determine the characteristics conveyed by sounds in the audio stream comprises analyzing the speaker content and the musical content to identify audio characteristics selected from the group consisting of: pace of speech, exuberance of speech, pace of music, and tone of music.

8. The computer-implemented method of claim 1, further comprising:

utilizing, by the one or more processors, an application programming interface of a cognitive agent to perform an aspect selected from the group consisting of: performing object recognition, analyzing the audio stream, generating the transcript, and performing the textual analysis.

9. The computer-implemented method of claim 1, wherein the objects in the repeating images identified are selected from the group consisting of: consumer products, company logos, types of food, landmarks, symbols, icons, people, and animals.

10. A computer program product comprising:

a computer readable storage medium readable by one or more processors and storing instructions for execution by the one or more processors for performing a method comprising:

obtaining, by the one or more processors of a streaming media platform, a request, from a first client utilized by a user, to stream selected content of content uploaded to the streaming media platform by a second client, wherein the uploaded content comprises one or more items;

identifying, by the one or more processors, a similarity between metadata associated with the selected content and metadata associated with relevant additional content selected from additional content uploaded to the streaming media platform by a third client, wherein the uploaded additional content comprises one or more items, wherein the metadata associated with the selected content and the metadata associated with the relevant additional content describe elements in the selected content and the relevant additional content identified, by the one or more processor, based on performing one or more content analyses of the selected content and the relevant additional content;

selecting, by the one or more processors, the relevant additional content from the additional content uploaded to the streaming media platform by a third client to provide to the first client with the selected content based on the similarity;

obtaining, by the one or more processors, the content from the second client and the additional content from the third client;

generating, by the one or more processors, metadata associated with each item of the content and of the additional content, wherein each item comprises an audio stream and a video stream, and wherein generating the metadata for each item comprises:

performing, by the one or more processors, object recognition to identify objects in repeating images in the video stream of an item;

analyzing, by the one or more processors, the audio stream of the item to determine characteristics conveyed by sounds in the audio stream in the audio stream selected from the group consisting of: emotion, tone, and sentiment;

generating, by the one or more processors, a transcript of speaker content comprising the audio stream of the item;

performing, by the one or more processors, a textual analysis of the transcript to identify keywords in the transcript indicative of characteristics of the text selected from the group consisting of: content, tone, sentiment, and topic; and retaining, by the one or more processors, the repeating images, characteristics conveyed by sounds in the audio stream, and characteristics of the text as the metadata associated with the item.

11. The computer program product of claim 10, wherein identifying the similarity further comprises:

obtaining, by the one or more processors, user demographics, from a user profile configured by the user of the first client on the streaming media platform;

obtaining, by the one or more processors, tags and categorizations associated with the selected content, wherein the tags and categorizations were uploaded by the second client, to the streaming media platform, with the selected content;

identifying, by the one or more processors, one or more items of prospective relevant additional content from the additional content, based on comparing the user demographics and the tags and categorizations to target audience specifications uploaded by the third client with the additional content and determining that the user demographics and the tags and categorizations conform to the target audience specifications of the prospective relevant additional content;

obtaining, by the one or more processors, metadata associated with each item of the prospective relevant additional content and metadata associated with the selected content; and identifying, by the one or more processors, an item comprising the relevant additional content from the prospective relevant additional content, based on identifying, the similarity between metadata associated with the selected content and metadata associated with relevant additional content.

12. The computer program product of claim 11, wherein identifying, the item comprising the relevant additional content from the prospective relevant additional content further comprises:

ranking, by the one or more processors, the prospective relevant additional content by item, based on level of similarity of metadata of the item and the metadata associated with the selected content; and identifying, by the one or more processors, the item comprising the relevant additional content as comprising the similarity, based on selecting an item from the prospective relevant additional content with a highest level of similarity as the item comprising the relevant additional content.

13. The computer program product of claim 12, wherein the highest level of similarity is defined by one or more business rules of a social media platform.

14. The computer program product of claim 10, the method further comprising:

displaying, by the one or more processors, the relevant additional content with the selected content on a viewer on the first client.

15. The computer program product of claim 10, wherein the sounds in the audio stream comprise the speaker content and musical content.

16. The computer program product of claim 15, wherein analyzing the audio stream of the item to determine the characteristics conveyed by sounds in the audio stream comprises analyzing the speaker content and the musical content to identify audio characteristics selected from the group consisting of: pace of speech, exuberance of speech, pace of music, and tone of music.

17. The computer program product of claim 10, the method further comprising:

utilizing, by the one or more processors, an application programming interface of a cognitive agent to perform an aspect selected from the group consisting of: performing object recognition, analyzing the audio stream, generating the transcript, and performing the textual analysis.

18. A system comprising:

a memory;

one or more processors in communication with the memory;

program instructions executable by the one or more processors via the memory to perform a method, the method comprising:

obtaining, by one or more processors of a streaming media platform, a request, from a first client utilized by a user, to stream selected content of content uploaded to the streaming media platform by a second client, wherein the uploaded content comprises one or more items;

identifying, by the one or more processors, a similarity between metadata associated with the selected content and metadata associated with relevant additional content selected from additional content uploaded to the streaming media platform by a third client, wherein the uploaded additional content comprises one or more items, wherein the metadata associated with the selected content and the metadata associated with the relevant additional content describe elements in the selected content and the relevant additional content identified, by the one or more processor, based on performing one or more content analyses of the selected content and the relevant additional content;

selecting, by the one or more processors, the relevant additional content from the additional content uploaded to the streaming media platform by a third client to provide to the first client with the selected content based on the similarity;

obtaining, by the one or more processors, the content from the second client and the additional content from the third client;

generating, by the one or more processors, metadata associated with each item of the content and of the additional content, wherein each item comprises an audio stream and a video stream, and wherein generating the metadata for each item comprises:

performing, by the one or more processors, object recognition to identify objects in repeating images in the video stream of an item;

analyzing, by the one or more processors, the audio stream of the item to determine characteristics conveyed by sounds in the audio stream in the audio stream selected from the group consisting of: emotion, tone, and sentiment;

generating, by the one or more processors, a transcript of speaker content comprising the audio stream of the item;

performing, by the one or more processors, a textual analysis of the transcript to identify keywords in the transcript indicative of characteristics of the text selected from the group consisting of: content, tone, sentiment, and topic; and retaining, by the one or more processors, the repeating images, characteristics conveyed by sounds in the audio stream, and characteristics of the text as the metadata associated with the item.

* * * * *